United States Patent [19]

Heidenreich et al.

[11] Patent Number: 4,711,954
[45] Date of Patent: Dec. 8, 1987

[54] 3-THIENYLAZO DYES WITH A GAMMA-ACID COUPLER

[75] Inventors: Holger Heidenreich, Cologne; Gerhard Wolfrum, Leverkusen, both of Fed. Rep. of Germany

[73] Assignee: Bayer Aktiengesellschaft, Leverkusen, Fed. Rep. of Germany

[21] Appl. No.: 836,047

[22] Filed: Mar. 4, 1986

[30] Foreign Application Priority Data

Mar. 22, 1985 [DE] Fed. Rep. of Germany ....... 3510410

[51] Int. Cl.$^4$ .................... C09B 29/033; C09B 29/30; D06P 1/39; D06P 3/24
[52] U.S. Cl. .................... 534/780; 534/582; 534/753; 534/765; 534/768; 534/769; 534/772; 534/778; 534/779; 534/791; 534/794; 549/68; 549/69
[58] Field of Search ............... 534/753, 765, 769, 791, 534/780

[56] References Cited

U.S. PATENT DOCUMENTS 4,264,495 4/1981 Maher et al. .................... 534/753
4,400,318 8/1983 Weaver et al. .................. 534/753 X

FOREIGN PATENT DOCUMENTS 837086  6/1960 United Kingdom ................ 534/753
1394365 5/1975 United Kingdom ................ 534/753
2011937 7/1979 United Kingdom ................ 534/753

OTHER PUBLICATIONS

Venkataraman, "The Chemistry of Synthetic Dyes", vol. 1, p. 270 (1952) Academic Press, Inc., publishers, New York.
Chemical Abstracts, Band 101, Nr. 22, Nov. 1984, No. 193660a, Columbus, Ohio, U.S.; & DD-A-157 911 (Harry Schaefer et al.), 15-12-1982.

Primary Examiner—Floyd D. Higel
Attorney, Agent, or Firm—Sprung Horn Kramer & Woods

[57] ABSTRACT

Azo dyestuffs which contain at least one water-solubilizing group and have the formula

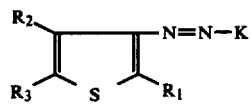

wherein
- K stands for the radical of a coupling component,
$R_1$ stands for CN, COOX, CONXY or COZ,
$R_2$ stands for hydrogen, halogen, CN, alkyl or aryl,
$R_3$ stands for alkyl or aryl,
X stands for H, alkyl, alkenyl, cycloalkyl, aryl or aralkyl and
Y stands for H or alkyl and
Z stands for alkyl or aryl, are highly suitable for dyeing polyamide fibres. The resulting dyeings are distinguished by good all-round fastness properties.

4 Claims, No Drawings

3-THIENYLAZO DYES WITH A GAMMA-ACID COUPLER

The invention relates to azo dyestuffs which contain at least one water-solubilising group and have the formula

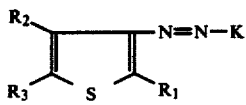
(I)

wherein
- K stands for the radical of a coupling component,
- $R_1$ stands for CN, COOX, CONXY or COZ,
- $R_2$ stands for hydrogen, halogen, CN, alkyl or aryl,
- $R_3$ stands for alkyl or aryl,
- X stands for H, alkyl, alkenyl, cycloalkyl, aryl or aralkyl and
- Y stands for H or alkyl and
- Z stands for alkyl or aryl, and the abovementioned cyclic and acyclic radicals can be substituted by further substituents customary in dyestuff chemistry.

Suitable water-solubilising groups are those of the formulae $-OSO_3H$, $-SSO_3H$ and in particular $-SO_3H$, of which generally 1 to 3, preferably one, are present.

The new dyestuffs can be present not only in the form of the free acid but also in the form of the alkali metal or ammonium salts.

For the purposes of the present invention, the alkyl radicals mentioned above in no particular context preferably have 1 to 8, in particular 1 to 4, C atoms and can be substituted by OH, Cl, F, CN or $C_1$-$C_4$-alkoxy.

Suitable aryl radicals are in particular phenyl radicals which can be substituted by $C_1$-$C_4$-alkyl, halogen, $CO_2$-$C_1$-$C_4$-alkyl, $NO_2$, $COCH_3$, $C_1$-$C_4$-alkoxy or CN.

Suitable aralkyl radicals are phenyl-$C_1$-$C_3$-alkyl radicals.

Suitable cycloalkyl radicals are cyclohexyl radicals.

The alkenyl radicals mentioned preferably have 3 to 6 C atoms.

"Halogen" is to be understood as meaning in particular Br and Cl.

Suitable coupling components are those from the series of aniline, naphthylamine, pyrazolone, pyridone, indole and in particular aminonaphthol compounds which contain 1 to 3 of the abovementioned acid groups.

Examples are coupling components of the following formulae:

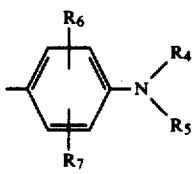

-continued

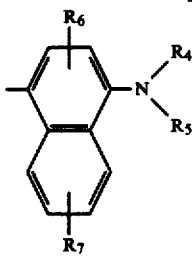

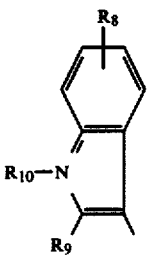

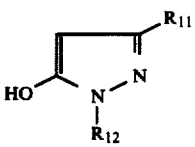

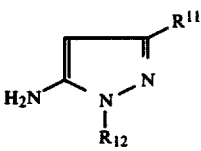

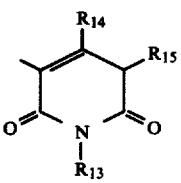

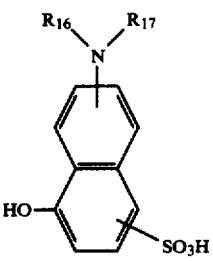

wherein
- $R_4$ is hydrogen, alkyl, alkenyl, aralkyl or aryl,
- $R_5$ is hydrogen, alkyl or aralkyl,
- $R_6$ is hydrogen, alkyl, alkoxy, halogen, COOX, CONXY, $-SO_2Z$ or $-NHCOZ$,
- $R_7$ is hydrogen, alkyl, $SO_3H$, alkoxy, halogen or $-NHCOZ$,
- $R_8$ is hydrogen, alkyl, alkoxy, halogen, CN or $SO_3H$,
- $R_9$ is hydrogen, alkyl or aryl,
- $R_{10}$ is hydrogen or alkyl,
- $R_{11}$ is hydrogen, alkyl, aryl, CN, COOX or CONXY,
- $R_{12}$ is hydrogen, alkyl, aralkyl or aryl,
- $R_{13}$ is hydrogen, alkyl, aralkyl or aryl,
- $R_{14}$ is hydrogen, methyl, OH, aryl or COOX, $R_{15}$ is $SO_3H$, CN, COOX or CONXY and
$R_{16}$ is hydrogen, alkyl, aralkyl, cycloalkyl or aryl,
$R_{17}$ is hydrogen or alkyl,
Z is alkyl or aryl, The water-solubilising groups —$OSO_3H$ and $SSO_3H$ preferably being present in the alkyl radicals $R_4$, $R_5$, $R_{10}$, $R_{12}$ and $R_{13}$ and the $SO_3H$ groups apart from in the above-mentioned alkyl radicals in the aryl (preferably phenyl) radicals or aralkyl (preferably benzyl), $R_4$, $R_5$, $R_{12}$ and $R_{13}$, unless other positions were previously specified above.

Preferred dyestuffs conform to the formula

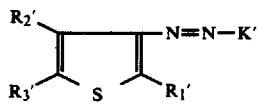
(II)

wherein
$R_1'$ stands for CN, COOX' or CONX'Y',
$R_2'$ stands for unsubstituted alkyl, aryl or preferably H,
$R_3'$ stands for aryl or unsubstituted alkyl,
K' stands for a radical of the formulae

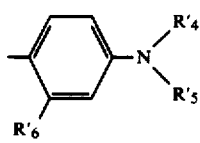
(a)

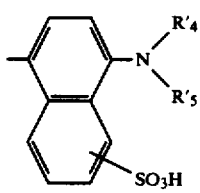
(b)

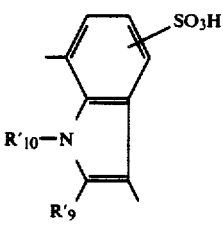
(c)

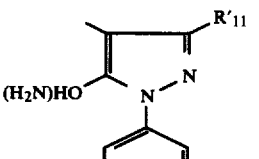
(d)

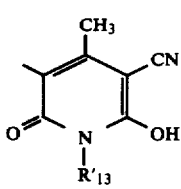
(e)

preferably

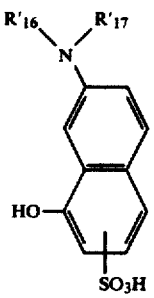
(f)

where
$R'_4$ denotes unsubstituted alkyl, preferably $C_2H_5$,
$R'_5$ denotes sulphatoalkyl, sulphoalkyl or sulphoaralkyl,
$R'_6$ denotes hydrogen, unsubstituted alkyl or NHCOX',
$R'_9$ denotes hydrogen, unsubstituted alkyl or aryl,
$R'_{10}$ denotes hydrogen or unsubstituted alkyl,
$R'_{11}$ denotes $CH_3$ or $CONH_2$,
$R'_{13}$ denotes unsubstituted alkyl or sulphoalkyl,
$R'_{16}$ denotes hydrogen, unsubstituted alkyl, cyclohexyl or aryl,
$R'_{17}$ denotes hydrogen or unsubstituted alkyl and
X, denotes unsubstituted alkyl or cyclohexyl,
Y' denotes unsubstituted alkyl or cyclohexyl or sulphoalkyl, the stated alkyl radicals preferably having 1 to 4 C atoms and the aryl radicals preferably being phenyl radicals and the aralkyl radicals preferably being benzyl radicals which, in the phenyl nucleus, can be substituted preferably 1 to 3 times by $C_1$–$C_4$-alkyl, Cl or $C_1$–$C_4$-alkoxy or 1 time by $SO_3H$, with the proviso that the dyestuffs contain at least one $SO_3H$ or $OSO_3H$ group.

Particular preference is given to dyestuffs of the formulae (I) or (II) in which K and K' each stands for the 2-amino-8-hydroxynaphthalene-6-sulphonic acid ("Y-acid").

Within the scope of these formulae, very particular preference is given to dyestuffs of the formula

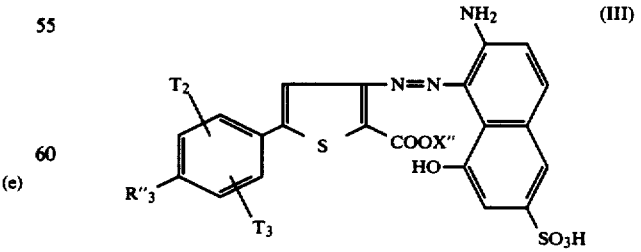
(III)

wherein
X" stands for $C_1$–$C_4$-alkyl or cyclohexyl and
$R''_3$ stands for

[Benzene ring with substituents T1, T2, T3]

or preferably for $C_1$-$C_4$-alkyl,
where
$T_{1-3}$ stand for $CH_3$, Cl, $OCH_3$, $OC_2H_5$, $CF_3$ or $C_2H_4OCF_3$.

Of these dyestuffs, preference is in turn given to those compounds of the stated formula in which
X" stands for $C_2H_5$, n-propyl or cyclohexyl and
R"$_3$ stands for $CH_3$, $C_2H_5$ or t-$C_4H_9$.

The new dyestuffs are obtained for example by coupling diazotised 3-aminothiophenes of the formula

[Structure IV: thiophene with $R_2$, $R_3$, $R_1$, $NH_2$ substituents]  (IV)

onto coupling components of the formula

A—K wherein
A stands for hydrogen or a leaving group (for example COOH, CHO, OH or $SO_3H$)

in a manner known per se (cf. for example GB-A-2,011,937).

The 3-aminothiophenes of the formula (IV) are either known or readily accessible by methods described in the literature (cf. "The Chemistry of Heterocyclic Compounds", Thiophene and its Derivatives; vol. 44, p. 1 et seq.).

For instance, some of these diazo components are obtained for example according to "Synthesis-Communications", March 1984, 275 et seq. by reacting compounds of the formula

[Structure V with $R_2''$, CN, $R_3$, V]  (V)

with compounds of the formula $R_1$—$CH_2$—SH  (VI)

in the presence of bases and—if $R_2''$=H—subsequent introduction of the halogen into the 4-position by means of conventional halogenating agents.

A further method for preparing (IV) corresponds to the process described in German Pat. No. 1,055,007, which is characterised in that compounds of the formula $R_3$—CH—CH—CN  (VII)
     |    |
     V    V are condensed with compounds of the formula

HS—$CH_2$—COOX  (VIII)

in the presence of bases.

Compounds of the formula (IV) where $R_2$=CN are obtained for example by reacting 1,3-oxathiolium salts of the formula

[Structure IX: oxathiolium salt with $R_1$, $R_3$, $S^\oplus$, O, $An^\ominus$]  (IX)

with malodinitrile in the presence of bases.

In all three cases the preferred basic condensing agent is an alkali metal alcoholate.

The new acid dyestuffs are very strong and are suitable for dyeing amido-containing natural and synthetic fibre materials, preferably those made of wool, silk and nylon.

The results obtained are level dyeings in yellow to violet hues having good all-round fastness properties, in particular good wet and light fastness properties.

EXAMPLE 1

7.16 g of 5-phenyl-3-amino-2-ethoxycarbonylthiophene are dissolved in a mixture of 30 ml of acetic acid, 5 ml of propionic acid and 30 ml of 80% strength phosphoric acid. The solution is cooled down to $-5°$ C. and is diazotised at this temperature with 9.3 ml of 40% strength nitrosylsulphuric acid. After 45 minutes the reaction solution is poured onto ice, and excess nitrile is removed with sulphamic acid. This diazonium salt solution is added to a solution, which has been cooled to 5° C. and adjusted beforehand to pH 1 by addition of about 5 ml of concentrated hydrochloric acid, of 7.73 g of 2-amino-8-hydroxynaphthalene-6-sulphonic acid in 100 ml of dimethylformamide. To complete the coupling, sodium carbonate solution is gradually added to set a pH of 1.5. The mixture is stirred for 3 hours, and the reaction product is then filtered off with suction and dried. This gives 12.5 g of a red dyestuff of the formula

[Structure: phenyl-thiophene azo dye with $CO_2C_2H_5$, $NH_2$, HO, $SO_3H$ substituents on naphthalene]

It dyes nylon fibres (PA) from aqueous solution in a bright bluish red. On wool a bright, somewhat less bluish red is obtained. ($\lambda_{max}$ in DMF: 563 nm).

The dyestuffs I listed in the table below, in which K=

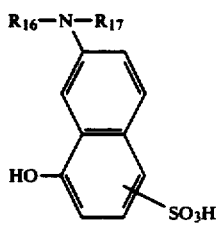

are obtained analogously.

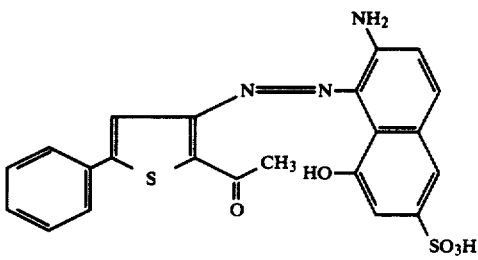

| | $R_1$ | $R_2$ | $R_3$ | $R_{16}$ | $R_{17}$ | Position of $SO_3H$ | Hue on PA |
|---|---|---|---|---|---|---|---|
| 2 | $CO_2C_2H_4OH$ | H | $C_6H_5$ | H | H | 6 | bluish red |
| 3 | $CO_2CH_3$ | H | $C_6H_5$ | H | H | 6 | bluish red |
| 4 | $CO_2C_3H_7$ | H | $C_6H_5$ | H | H | 6 | bluish red |
| 5 | $CO_2CH_2CH_2$—$OCH_3$ | H | $C_6H_5$ | H | H | 6 | bluish red |
| 6 | $CO_2C_2H_5$ | H | 4-$CH_3$—$C_6H_4$ | H | H | 6 | bluish red |
| 7 | $CO_2CH_3$ | H | 4-$CH_3O$—$C_6H_4$ | H | H | 6 | bluish red |
| 8 | $CO_2C_3H_7$ | H | 3-$CF_3$—$C_6H_4$ | H | H | 6 | bluish red |
| 9 | $CO_2CH_3$ | H | 4-Cl—$C_6H_4$ | H | H | 6 | bluish red |
| 10 | $CO_2C_2H_5$ | H | 4-Cl—3-Cl—$C_6H_3$ | H | H | 6 | bluish red |
| 11 | $CO_2CH_3$ | H | 4-Br—$C_6H_4$ | H | H | 6 | bluish red |
| 12 | $CO_2C_2H_4$ | H | 4-$CH_3$—3-Cl—$C_6H_3$ | H | H | 6 | bluish red |
| 13 | $CONH_2$ | H | $C_6H_5$ | H | H | 6 | red |
| 14 | $CONHC_2H_5$ | H | $C_6H_5$ | H | H | 6 | red |
| 15 | $CON(C_2H_5)_2$ | H | $C_6H_5$ | H | H | 6 | red |
| 16 | $CONHC_2H_4SO_3H$ | H | $C_6H_5$ | H | H | 6 | red |
| 17 | CON—$C_2H_4SO_3H$ $CH_3$ | H | 4-Cl—$C_6H_4$ | H | H | 6 | red |
| 18 | CON—$C_4H_8$—$SO_3H$ H | H | 3-Cl—4-$CH_3$—$C_6H_3$ | H | H | 6 | red |
| 19 | $CO_2C_3H_7$ | H | $CH_3$ | H | H | 6 | bluish red |
| 20 | $CON(C_2H_5)$ | H | $CH_3$ | H | H | 6 | red |
| 21 | CN | H | $CH_3$ | H | H | 6 | bluish red |
| 22 | $COCH_3$ | H | 4-$CH_3$—$C_6H_4$ | H | H | 6 | bluish red |
| 23 | $COCH_3$ | H | 4-Cl—$C_6H_4$ | H | H | 6 | bluish red |
| 24 | CO—$C_6H_5$ | H | $C_6H_5$ | H | H | 6 | bluish red |
| 25 | CN | H | $C_6H_5$ | H | H | 6 | bluish red |
| 26 | CN | H | $C_6H_5$ | H | H | 5 | bluish red |
| 27 | $CON(CH_3)_2$ | H | 4-Cl—$C_6H_4$ | H | H | 5 | bluish red |
| 28 | $CO_2C_2H_5$ | H | 4-Cl—$C_6H_4$ | H | H | 5 | bluish red |
| 29 | $COCH_3$ | H | 4-$CH_3$—$C_6H_4$ | H | H | 5 | bluish red |
| 30 | CO—$C_2H_5$ | H | 4-$CH_3$—$C_6H_4$ | H | H | 5 | bluish red |
| 31 | $CO_2C_3H_7$ | H | $CH_3$ | H | $CH_3$ | 5 | bluish red |
| 32 | $CO_2C_2H_5$ | H | $CH_3$ | H | $CH_3$ | 6 | bluish red |
| 33 | $CO_2CH_3$ | H | $C_6H_5$ | $CH_3$ | $CH_3$ | 6 | bluish red |
| 34 | $COCH_3$ | H | $C_6H_5$ | H | $C_6H_5$ | 6 | bluish red |
| 35 | $CO_2C_3H_7$ | H | $C_6H_5$ | H | $C_2H_4$—CN | 6 | bluish red |
| 36 | $CO_2CH_3$ | $CH_3$ | 4-Cl—$C_6H_4$ | H | H | 6 | bluish red |
| 37 | $COC_6H_5$ | CN | $C_6H_5$ | H | H | 6 | bluish red |
| 38 | $CO_2C_2H_5$ | H | CN | H | H | 6 | bluish red |

EXAMPLE 39

6.26 g of 5-phenyl-3-amino-2-acetylthiophene are dissolved in 30 ml of acetic acid, 10 ml of propionic acid and 30 ml of 85% strength phosphoric acid and are diazotised at −5° C. with 9.3 ml of 40% strength nitrosylsulphuric acid. After 45 minutes the solution is poured onto ice, excess nitrite is removed with sulphamic acid, and the diazonium salt solution is then added to an aqueous acid solution of 7.73 g of 2-amino-8-hydroxynaphthalene-6-sulphonic acid. Saturated sodium acetate solution is used to neutralise to pH 2, which is followed by 3 hours of stirring. The reaction product is filtered off with suction and dried. This gives 12 g of a red dyestuff of the formula which dyes nylon fibres and wool from aqueous solution in a bright strongly bluish red ($\lambda_{max}$:571 nm in DMF).

The 5-phenyl-3-amino-2-acetylthiophene used as the diazo component is obtained as follows:

To a solution prepared from 11.5 g of sodium and 350 ml of ethanol are added 45 g of mercaptoacetone followed by 81.75 g of β-chlorocinnamonitrile. To complete the reaction the mixture is heated at the boil for 30 minutes. The reaction mixture is discharged onto ice and the product is isolated by filtering with suction. Recrystallisation from ethanol gives yellow crystals (melting point 136° C.).

EXAMPLE 40

5.36 g of 5-methyl-3-amino-2-ethoxycarbonylthiophene are diazotised at 0° C. in 100 ml of acetic acid and 20 ml of concentrated hydrochloric acid with a solution of 2.2 g of sodium nitrile in 80 ml of water. After 45 minutes excess nitrite is removed with sulphamic acid, which is followed by coupling in the manner described above onto 7.73 g of 2-amino-8-hydroxynaphthalene-6-sulphonic acid. Isolation yields 11 g of a red powder of the formula

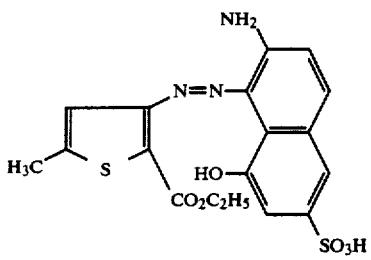

which dyes nylon fibres and wool from aqueous solution in a bright bluish red ($\lambda_{max}$: 562 nm in DMF).

The 5-methyl-3-amino-2-ethoxycarbonylthiophene used as the diazo component is prepared as followed:

11.5 g of sodium are dissolved in 350 ml of ethanol, and 62.5 g of ethyl α-mercaptoacetate are added. To this solution is then added dropwise a mixture of 50.75 g of β-chlorocrotonitrile in 50 ml of ethanol. The mixture is refluxed for 1 hour and discharged onto ice, and the precipitate is filtered off with suction. The compound has the following characteristic IR absorption lines in KBr: 1660, 3400 and 3350 cm$^{-1}$ (melting point: 41° C.).

EXAMPLE 41

A diazonium salt solution is prepared from 8.16 g of 5-(p-chlorophenyl)-3-amino-2-ethoxycarbonylthiophene as described in Example 1. This solution is added to an aqueous solution of 7.1 g of N-ethyl-N-sulphatoethylaniline. Dilute sodium carbonate solution is used to neutralise to pH 4, which is followed by 2 hours of stirring and isolation of the dyestuff by filtration with suction. Drying leaves 14.5 g of an orange-coloured dyestuff of the formula

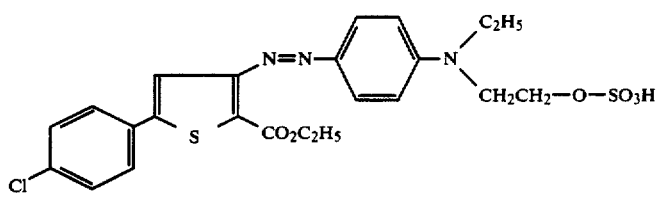

which dyes nylon fibres and wool from an aqueous bath in bright yellowish red shades ($\lambda_{max}$: 465 nm in DMF).

An analogous procedure is used to obtain the following dyestuffs of the formula shown.

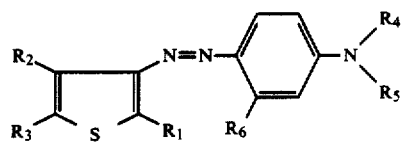

| Example | R$_1$ | R$_2$ | R$_3$ | R$_4$ | R$_5$ | R$_6$ | Hue on PA |
|---|---|---|---|---|---|---|---|
| 42 | CO$_2$C$_2$H$_5$ | H | —C$_6$H$_6$ | C$_2$H$_5$ | C$_2$H$_4$SO$_3$H | CH$_3$ | yellowish orange |
| 43 | CO$_2$CH$_3$ | H | 4-CH$_3$C$_6$H$_4$ | C$_2$H$_5$ | CH$_2$— | H | yellowish orange |
| 44 | COCH$_3$ | H | CH$_3$ | C$_2$H$_5$ | " | CH$_3$ | orange |
| 45 | COC$_6$H$_5$ | CN | C$_6$H$_5$ | CH$_3$ | C$_2$H$_4$—O—SO$_3$H | CH$_3$ | yellowish orange |
| 46 | CN | CH$_3$ | CH$_3$ | C$_2$H$_5$ | CH$_2$— | CH$_3$ | yellowish orange |
| 47 | CO$_2$C$_2$H$_5$ | H | 4-Cl—C$_6$H$_4$ | C$_2$H$_5$ | " | CH$_3$ | yellowish orange |
| 48 | CONH$_2$ | H | 4-CH$_3$—C$_6$H$_4$ | C$_2$H$_5$ | " | H | yellowish orange |
| 49 | CON(C$_2$H$_5$)$_2$ | H | 4-CH$_3$—C$_6$H$_4$ | C$_2$H$_5$ | " | CH$_3$ | yellowish orange |
| 50 | CONH$_2$C$_2$H$_4$SO$_3$H | H | C$_6$H$_5$ | C$_2$H$_5$ | C$_2$H$_5$ | NHCOCH$_3$ | red |
| 51 | CON—C$_2$H$_4$SO$_3$H<br>CH$_3$ | H | CH$_3$O—C$_6$H$_4$ | C$_2$H$_5$ | C$_2$H$_5$ | NHCONHCH$_3$ | red |

The naphthylamine derivatives below are likewise prepared analogously. These dyestuffs conform to the formula

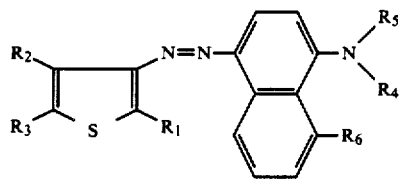

| Example | $R_1$ | $R_2$ | $R_3$ | $R_4$ | $R_5$ | $R_6$ | Hue on PA |
|---|---|---|---|---|---|---|---|
| 52 | $CO_2C_2H_5$ | H | $C_6H_5$ | H | $C_6H_5$ | $SO_3H$ | claret |
| 53 | $COCH_3$ | H | 4-Cl—$C_6H_4$ | H | 4-$CH_3$—$C_6H_4$ | $SO_3H$ | claret |
| 54 | CN | H | 4-$CH_3C_6H_4$ | $C_2H_5$ | $C_2H_5$ | $SO_3H$ | reddish blue |
| 55 | $COCH_3$ | H | —CN | H | $C_6H_5$ | $SO_3H$ | reddish blue |

EXAMPLE 56

3.13 g of 5-phenyl-3-amino-2-acetylthiophene are diazotised at −5° C. in 10 ml of DMF, 20 ml of acetic acid, 5 ml of propionic acid and 20 ml of 85% strength phosphoric acid with 4.7 ml of nitrosylsulphuric acid. The mixture is stirred for 60 minutes and is discharged onto ice, excess nitrite is destroyed with sulphamic acid, and the mixture is added to an aqueous solution of 3.95 g of 2-phenylindolesulphonic acid. By neutralisation with sodium acetate the coupling reaction to give the dyestuff is completed. Filtration with suction and drying gives 7.0 g of a red powder of the formula

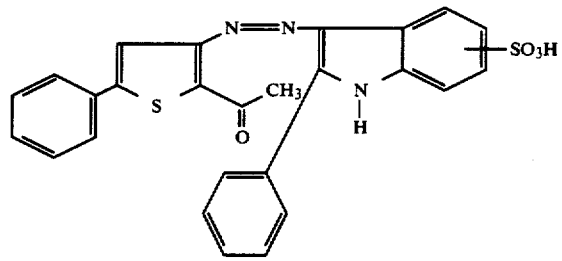

which dyes nylon fibres or wool from an aqueous bath in a strongly reddish yellow ($\lambda_{max}$: 435 nm in DMF). An analogous procedure gives the following dyestuffs of the formula

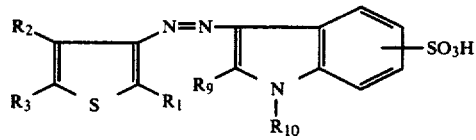

| Example | $R_1$ | $R_2$ | $R_3$ | $R_9$ | $R_{10}$ | Hue on PA |
|---|---|---|---|---|---|---|
| 57 | $CO_2CH_3$ | H | $C_6H_5$ | $C_6H_5$ | H | reddish yellow |
| 58 | $CO_2C_3H_7$ | H | 4-Cl—$C_6H_4$ | $CH_3$ | $CH_3$ | reddish yellow |
| 59 | $COCH_3$ | H | 4-$CH_3O$—$C_6H_4$ | $C_6H_5$ | $CH_3$ | reddish yellow |
| 60 | $CON(C_2H_5)_2$ | $CH_3$ | CN | $C_6H_5$ | $CH_3$ | reddish yellow |
| 61 | $COC_6H_5$ | CN | $C_6H_5$ | $C_6H_5$ | $CH_3$ | yellowish red |

EXAMPLE 62

8.16 g of 5-(p-chlorophenyl)-3-amino-2-ethoxycarbonylthiophene are diazotised at −5° C. in a mixture of 30 ml of 85% strength phosphoric acid, 30 ml of acetic acid and 5 ml of propionic acid with 9.3 ml of nitrosylsulphuric acid. After 60 minutes the solution is discharged onto ice, excess nitrite is destroyed with sulphamic acid and is then allowed to react with an aqueous solution of 7.3 g of 3-(5-amino-3-methyl-1H-pyrazol-1-yl)benzenesulphonic acid by neutralisation with sodium acetate. Completion of the coupling reaction is followed by filtration with suction and drying. This gives 14.0 g of a yellow dyestuff of the formula

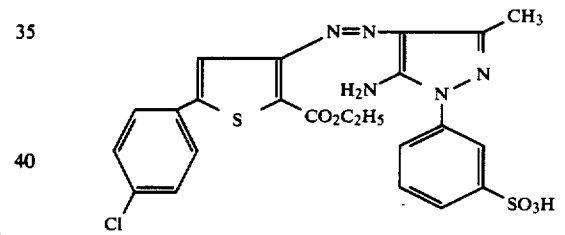

which dyes nylon fibres and wool from aqueous solution in a bright greenish yellow ($\lambda_{max}$: 434 nm in DMF).

An analogous procedure gives the following dyestuffs of the formula

| Example | $R_1$ | $R_2$ | $R_3$ | W | $R_{11}$ | Hue on PA |
|---|---|---|---|---|---|---|
| 63 | $CO_2C_2H_5$ | H | $C_6H_5$ | OH | $CH_3$ | yellow |
| 64 | $CO_2C_2H_5$ | H | $C_6H_5$ | $NH_2$ | $CH_3$ | yellow |
| 65 | $COCH_3$ | H | 3-Cl, 4-Cl—$C_6H_3$ | OH | $CONH_2$ | yellow |
| 66 | $COCH_3$ | H | 3-Cl, 4-Cl—$C_6H_3$ | $NH_2$ | $CONH_2$ | yellow |
| 67 | $COC_6H_5$ | CN | $C_6H_5$ | OH | $CH_3$ | yellow |
| 68 | $COC_6H_5$ | CN | $C_6H_5$ | $NH_2$ | $CH_3$ | yellow |

EXAMPLE 69

40.2 g of 5-(p-methoxyphenyl)-3-amino-2-ethoxycarbonylthiophene are diazotised in the manner described above. This diazonium salt solution is added at neutral pH to 5.92 g of 6-hydroxy-1,4-dimethyl-3-sulphomethyl-2-pyridone. Stirring is continued for 3 hours, followed by acidification and filtration with suction. Drying leaves 8.5 g of a yellow dyestuff of the formula

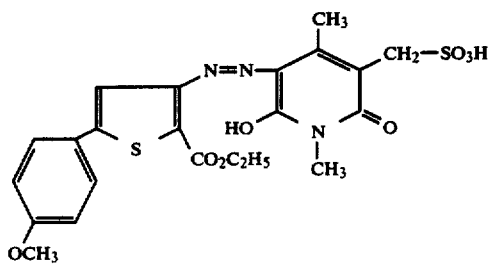

which dyes nylon fibres and wool from aqueous solution in bright greenish yellow shades ($\lambda_{max}$: 430 nm in DMF).

An analogous procedure is used to obtain the following dyestuffs of the formula

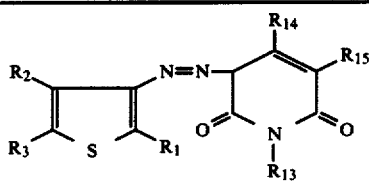

| Example | $R_1$ | $R_2$ | $R_3$ | $R_{14}$ | $R_{15}$ | $R_{13}$ | Hue on PA |
|---|---|---|---|---|---|---|---|
| 70 | $CO_2C_2H_5$ | H | $C_6H_5$ | $CH_3$ | CN | $C_2H_4SO_3H$ | yellow |
| 71 | $COCH_3$ | H | $C_6H_5$ | $CH_3$ | CN | $C_2H_4SO_3H$ | yellow |
| 72 | CN | H | $CH_3$ | $CH_3$ | $CONH_2$ | $C_2H_4SO_3H$ | yellow |
| 73 | $CO_2C_3H_7$ | H | $4CH_3O-C_6H_4$ | $CH_3$ | $SO_3H$ | $C_2H_5$ | yellow |
| 74 | $CO_2CH_3$ | H | $4-Cl-C_6H_4$ | $CH_3$ | $SO_3H$ | $C_3H_7$ | yellow |

What is claimed is:

1. An azo dyestuff of the formula

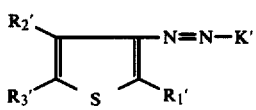

wherein
$R_1'$ stands for CN, COOX' or CONH2'
$R_2'$ stands for hydrogen, $C_1-C_4$-alkyl, or phenyl which is unsubstituted or substituted 1 to 3 times by $C_1-C_4$-alkyl, CL or $C_1-C_4$-alkoxy or substituted once by $SO_3H$,
$R_3'$ stands for $C_1-C_4$-alkyl or phenyl which is unsubstituted or substituted 1 to 3 times by $C_1-C_4$-alkyl, Cl or $C_1-C_4$-alkoxy or substituted once by $SO_3H$,
K' stands for a radical of the formula

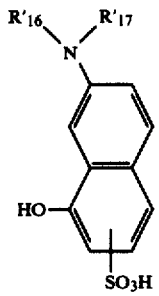

wherein
$R'_{16}$ is hydrogen, $C_1-C_4$-alkyl, cyclohexyl or phenyl which is unsubstituted or substituted 1 to 3 times by $C_1-C_4$-alkyl, Cl or $C_1-C_4$-alkoxy or substituted once by $SO_3H$,
$R'_{17}$ is hydrogen or $C_1-C_4$-alkyl, and
X' denotes cyclohexyl or $C_1-C_4$-alkyl.

2. An azo dyestuff according to claim 1 of the formula

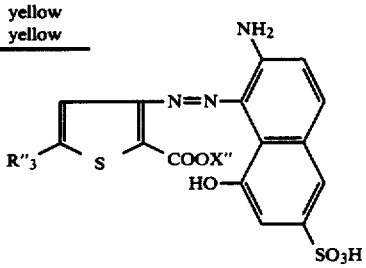

wherein
X" stands for $C_1-C_4$-alkyl or cyclohexyl and
R"$_3$ stands for

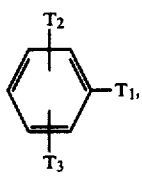

or $C_1-C_4$-alkyl, where
$T_1$, $T_2$ and $T_3$ stand for $CH_3$, Cl, $OCH_3$, $OC_2H_5$, $CF_3$ or $C_2H_4OCF_3$.

3. An azo dyestuff according to claim 2, wherein X" stands for $C_2H_5$, $C_3H_7$ or cyclohexyl and R″₃ stands for $CH_3$, $C_2H_5$ or $t-C_4H_9$.
4. An azo dyestuff according to claim 1 of the formula
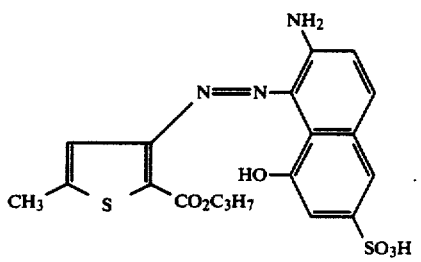
* * * * *

UNITED STATES PATENT AND TRADEMARK OFFICE
CERTIFICATE OF CORRECTION

PATENT NO. : 4,711,954

DATED : December 8, 1987

INVENTOR(S) : Holger Heidenreich, et al.

It is certified that error appears in the above-identified patent and that said Letters Patent is hereby corrected as shown below:

| | |
|---|---|
| Col. 4, line 1 | Before "preferably" insert --or-- |
| Col. 5, line 50 | Insert --(R'' = H, alkyl or aryl; V = Cl, Br)-- |
| Col. 6, line 14 | Insert --(An = anion, for example $ClO_4^-$)-- |
| Col. 6, line 36 and Col. 8, line 67 | Delete "nitrile" and substitute --nitrite-- |
| Col. 11, Example 54, under "$R_3$" | Delete "$4-CH_3C_6H_4$" and substitute --$4-CH_3-C_6H_4$-- |

Signed and Sealed this

Fifth Day of July, 1988

Attest:

DONALD J. QUIGG

Attesting Officer

Commissioner of Patents and Trademarks